(12) United States Patent
Kulesha

(10) Patent No.: US 8,142,124 B2
(45) Date of Patent: Mar. 27, 2012

(54) METHODS AND SYSTEMS FOR CAPTIVE FASTENING

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 933 days.

(21) Appl. No.: 11/610,253

(22) Filed: Dec. 13, 2006

(65) Prior Publication Data

US 2008/0145177 A1 Jun. 19, 2008

(51) Int. Cl.
*F16B 39/04* (2006.01)

(52) U.S. Cl. .......... 411/87; 411/149; 411/150; 411/353; 411/366.1; 411/427; 411/432; 411/531; 411/533; 411/999

(58) Field of Classification Search .............. 411/85–87, 411/102, 105, 149–150, 353, 366.1, 432, 411/533, 970, 999, 204, 427, 530–531, 399, 411/436, 932
See application file for complete search history.

(56) References Cited

U.S. PATENT DOCUMENTS

| | | | | |
|---|---|---|---|---|
| 232,432 A | * | 9/1880 | Allison | 285/333 |
| 470,238 A | * | 3/1892 | Goodman | 411/243 |
| 857,526 A | * | 6/1907 | Knopf | 411/243 |
| 995,468 A | * | 6/1911 | Kenney | 411/243 |
| 1,026,035 A | * | 5/1912 | Hedded | 411/105 |
| 1,209,460 A | * | 12/1916 | Lowe | 411/353 |
| 1,282,871 A | * | 10/1918 | Kraft | 411/436 |
| 2,156,169 A | * | 4/1939 | Unke | 138/96 T |
| 2,324,175 A | * | 7/1943 | Simms | 411/427 |
| 2,375,325 A | * | 5/1945 | Robertson | 411/277 |
| 2,425,464 A | * | 8/1947 | George | 411/136 |
| 2,745,162 A | * | 5/1956 | Zahodiakin | 411/551 |
| 2,757,429 A | * | 8/1956 | Mills | 411/551 |
| 3,037,542 A | * | 6/1962 | Boyd | 411/105 |
| 3,059,736 A | * | 10/1962 | Boyd | 403/7 |
| 3,101,641 A | * | 8/1963 | Walker et al. | 411/348 |
| 3,168,321 A | * | 2/1965 | Milton | 277/637 |
| 3,180,389 A | * | 4/1965 | Charles | 411/350 |
| 3,368,602 A | * | 2/1968 | Boyd | 411/105 |
| 3,417,802 A | * | 12/1968 | Oldenkott | 411/134 |
| 3,468,212 A | * | 9/1969 | Tinnerman | 411/436 |
| 3,550,498 A | * | 12/1970 | Briles | 411/432 |
| 3,800,396 A | * | 4/1974 | Puchner | 29/413 |

(Continued)

FOREIGN PATENT DOCUMENTS

DE 9114978 U1 4/1992

(Continued)

OTHER PUBLICATIONS

European Search Report regarding EP1933046, dated Apr. 23, 2010.

*Primary Examiner* — Victor Batson
*Assistant Examiner* — Roberta Delisle
(74) *Attorney, Agent, or Firm* — Armstrong Teasdale LLP

(57) ABSTRACT

Methods and systems for an integrated captive fastener system is provided. A system includes an integrated nut assembly configured to be tethered to a first structure, the nut assembly including at least one of a lock washer and a flat washer coupled to a nut using a retainer, and a bolt configured to be tethered to at least one of the first structure and a second structure, the nut assembly configured to be threadably couplable to the bolt.

12 Claims, 3 Drawing Sheets

U.S. PATENT DOCUMENTS

| | | | | |
|---|---|---|---|---|
| 3,978,761 A | * | 9/1976 | Sosinski | 411/5 |
| 4,191,236 A | * | 3/1980 | Duran | 411/105 |
| 4,883,399 A | * | 11/1989 | MacLean | 411/431 |
| 5,044,854 A | | 9/1991 | Oh | |
| 5,080,545 A | * | 1/1992 | McKinlay | 411/149 |
| 5,190,423 A | * | 3/1993 | Ewing | 411/134 |
| 5,203,656 A | * | 4/1993 | McKinlay | 411/149 |
| 5,393,183 A | * | 2/1995 | Hinton | 411/432 |
| 5,624,218 A | * | 4/1997 | Dauwalter | 411/87 |
| 5,626,449 A | * | 5/1997 | McKinlay | 411/149 |
| 5,688,091 A | * | 11/1997 | McKinlay | 411/149 |
| 5,692,865 A | * | 12/1997 | Pratt | 411/55 |
| 5,957,642 A | * | 9/1999 | Pratt | 411/55 |
| 6,318,924 B1 | * | 11/2001 | Schiavo, Jr. | 403/299 |
| 6,357,953 B1 | * | 3/2002 | Ballantyne | 403/43 |
| 6,554,555 B2 | * | 4/2003 | Imahigashi | 411/533 |
| 6,669,428 B2 | * | 12/2003 | Autterson et al. | 411/531 |
| 6,692,083 B2 | * | 2/2004 | Latham | 299/104 |
| 6,789,993 B2 | * | 9/2004 | Ozawa et al. | 411/546 |
| 6,866,456 B2 | * | 3/2005 | Bentrim | 411/353 |
| 7,021,876 B2 | | 4/2006 | Gulistan | |
| 7,094,020 B2 | | 8/2006 | Dong et al. | |
| 2005/0201846 A1 | | 9/2005 | Santamaria | |
| 2006/0053768 A1 | | 3/2006 | Anderson et al. | |

FOREIGN PATENT DOCUMENTS

WO 9403736 A1 2/1994

* cited by examiner

METHODS AND SYSTEMS FOR CAPTIVE FASTENING

BACKGROUND OF THE INVENTION

This invention relates generally to fastening systems and more particularly, to methods and systems for captive fasteners with integrated lock washer system.

Assembly of large structures such as space stations, drilling platforms, and precision clearance machinery requires a strict accounting of assembly hardware to ensure stray hardware do not cause damage to the assembled structure. For example, a nut or bolt drifting away from a space station may become a long term projectile hazard for subsequent spacecraft in the vicinity of the space station. A bolt dropped into a reduction gear may cause damage to the gears of jamming of the machinery such that it is no longer operable. Retrieving the hardware after is has been dropped or otherwise lost is often difficult if not impossible. This is notable in erecting undersea structures, isolated structures and recently structures for the international space station.

BRIEF DESCRIPTION OF THE INVENTION

In one embodiment, an integrated captive fastener system includes an integrated nut assembly configured to be tethered to a first structure, the nut assembly including at least one of a lock washer and a flat washer coupled to a nut using a retainer, and a bolt configured to be tethered to at least one of the first structure and a second structure, the nut assembly configured to be threadably couplable to the bolt.

In another embodiment, a method of assembling a captive fastening system includes coupling at least one of a flat washer and a lock washer to a nut using a retaining member forming a nut assembly, threading the nut assembly onto a bolt, and applying a torque to the nut to compress the lock washer between the nut and the flat washer.

In yet another embodiment, a captive fastener system for securing two components to one another includes an integrated nut assembly including a lock washer and a flat washer loosely coupled to a nut using a retainer threadably coupled to the nut, a bolt configured to be threadably couplable to the nut.

DETAILED DESCRIPTION OF THE INVENTION

Figure 1:
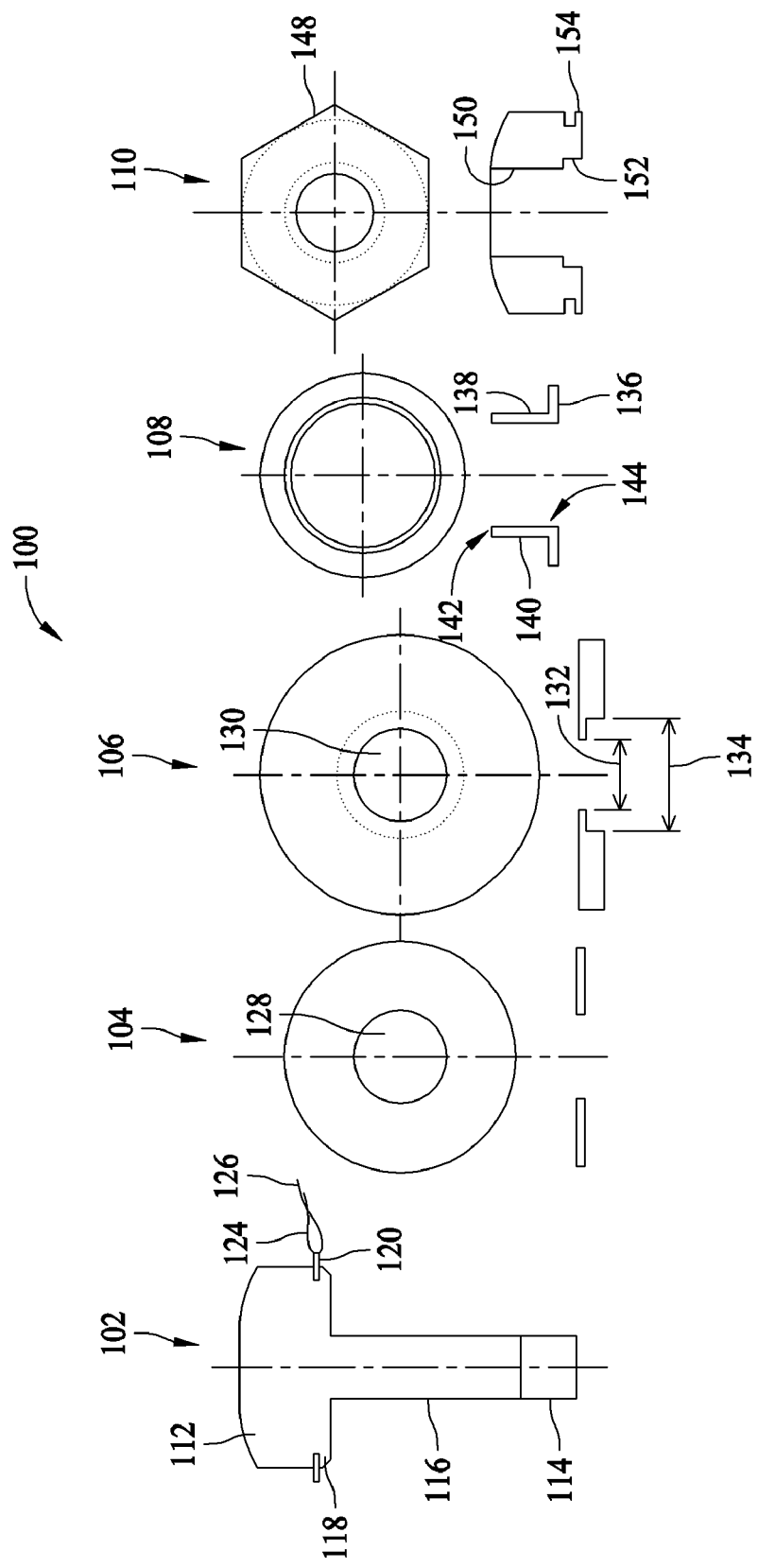
FIG. 1 is a plan and sectional view of components of an exemplary captive fastening system in accordance with an embodiment of the present invention.

FIG. 1 is a plan and sectional view of components of an exemplary captive fastening system 100 in accordance with an embodiment of the present invention. In the exemplary embodiment, captive fastening system 100 includes a bolt 102, a lock washer 104, a flat washer 106, a retainer 108, and a nut 110. Bolt 102 includes a head 112, a threaded portion 114, and a shank 116 extending therebetween. Head 112 includes an external driving feature, such as wrench pads or an internal driving feature, for example, but not limited to slotted, Phillips, pozidriv, hexalobular or Torx™, hex key, Robertson, tri-wing, torq-set, and spanner head. Head 112 also includes a circumferential groove 118 configured to receive a complementary snap-ring 120. An aperture 122 extending through snap-ring 120 is configured to receive a first end 124 of a lanyard 126. A second end (not shown) of lanyard 126 is configured to couple to a captive structure (not shown) to which bolt 102 is to be retained.

In the exemplary embodiment, lock washer 104 comprises a split ring style lock washer. A central aperture 128 is sized to receive shank 116 loosely. Flat washer 106 includes a counter-bored central aperture 130. The counter bore provides for two diameters of aperture 130 through the thickness of flat washer 106. A first diameter 132 is sized to receive shank 116 loosely and a second diameter 134 is sized to receive an outwardly radially extending portion 136 of retainer 108. Retainer 108 includes a tubular body 138 having external circumferential threads 140 about a first end 142 and radially extending portion 136 extending circumferentially about a second end 144.

In the exemplary embodiment, nut 110 comprises at least one wrench pad 148 including a central counter bore having first threads 150 and second threads 152. Threads 150 are configured to engage threads 114 and threads 152 are configured to engage threads 140. Nut 110 also includes a circumferential groove 154 configured to receive a complementary second snap-ring (not shown). An aperture extending through second snap-ring is configured to receive a first end of a lanyard. A second end of the lanyard is configured to couple to a captive structure (not shown) to which nut 110 is to be retained.

Figure 2:
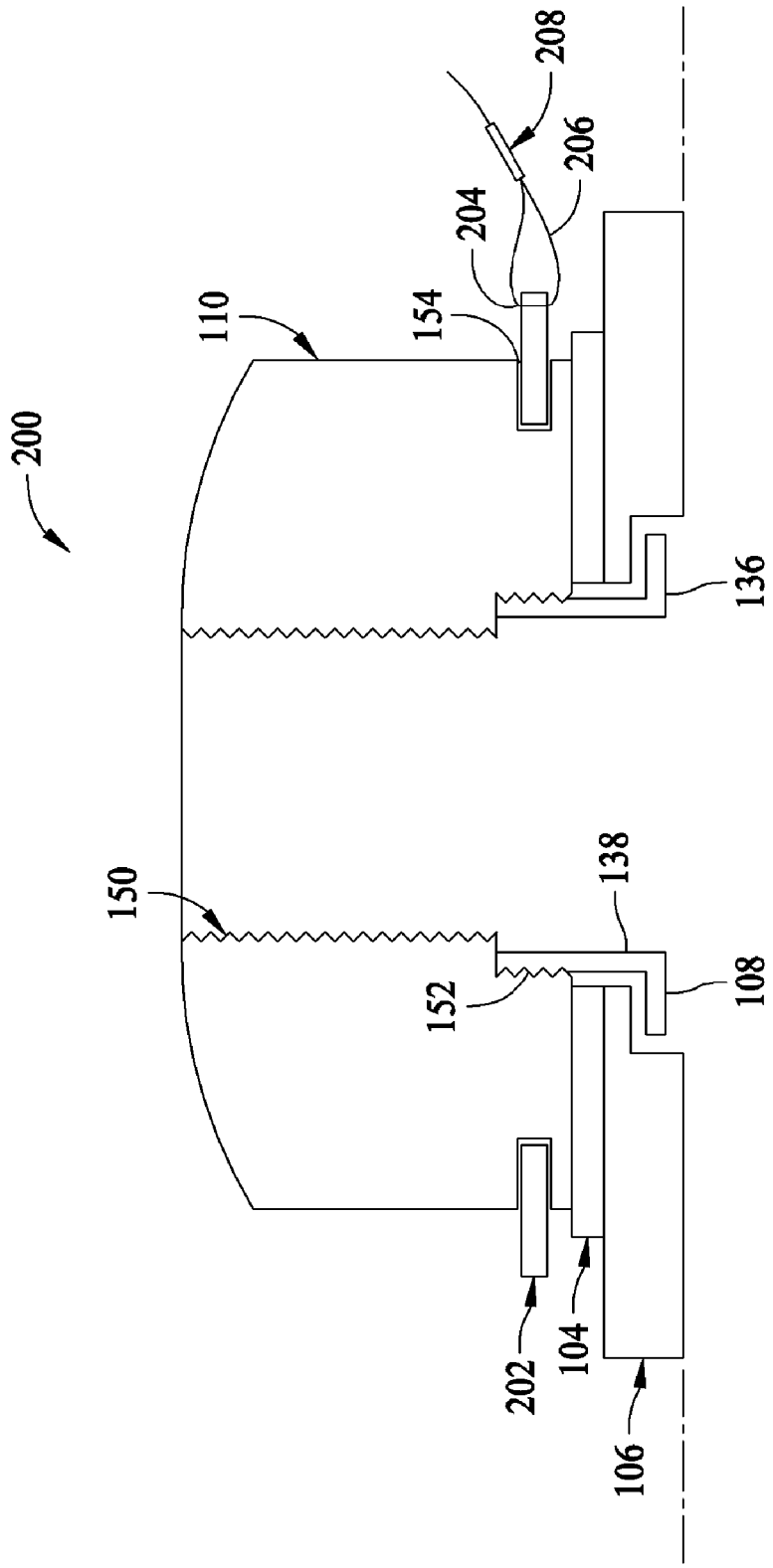
FIG. 2 is a section view of a nut assembly in accordance with an exemplary embodiment of the present invention.

FIG. 2 is a section view of a nut assembly 200 in accordance with an exemplary embodiment of the present invention. In the exemplary embodiment, retainer body 138 is inserted through the counter bored side of flat washer 106 such that radially extending portion 136 engages the bored portion of flat washer 106. Retainer body 138 is then inserted through central bore 128 of lock washer 104. Retainer 108 is threaded into nut 110 to engage threads 140 and threads 152. When retainer 108 bottoms out in threads 140, radially extending portion 136 has not yet clamped flat washer 106 and lock washer 104 against the bottom of nut 110. Flat washer 106 and lock washer 104 are loosely held between radially extending portion 136 and nut 110. Nut 110 also includes a circumferential groove 154 configured to receive a complementary second snap-ring 202. An aperture 204 extending through second snap-ring 202 is configured to receive a first end 206 of a lanyard 208. A second end of the lanyard (not shown) is configured to couple to a structure (not shown) to which nut 110 is to be retained.

Figure 3:
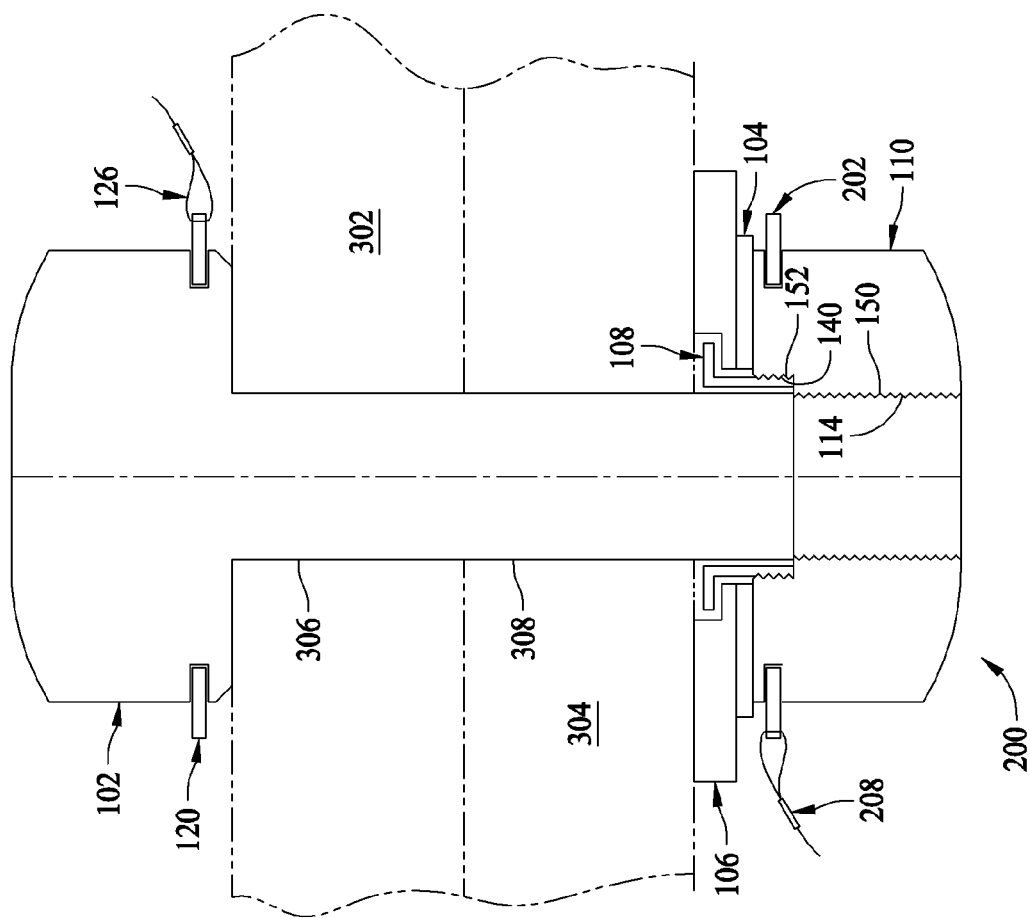
FIG. 3 is a section view of captive fastening system shown in FIG. 1.

FIG. 3 is a section view of captive fastening system 100 (shown in FIG. 1). In the exemplary embodiment, bolt 102 and nut assembly 200 are used in combination to secure a first component 302 to a second component 304. Each of components 302 and 304 include a predefined aperture 306 and 308, respectively. Apertures 306 and 308 are aligned prior to bolt 102 being inserted through apertures 306 and 308. Nut assembly 200 is threadably engaged to bolt 102 such that threads 150 are engaged to threads 114. Bolt 102 is secured to component 302 or other proximate structure using lanyard 126 and nut assembly 200 is secured to component 304 or other proximate structure using lanyard 208.

During operation, bolt 102 and nut assembly may be tightened using standard wrenches to torque nut down until lock washer 104 is substantially compressed. Because of the sizing of radially extending portion 136 and the counter bore of flat washer 106, nut assembly 200 clamps lock washer 104 and flat washer 106 against component 304 before radially extending portion 136 contacts component 304. Nut assembly 200 is unthreaded from bolt 102 using standard wrenches, which do not interfere with snap-rings 120 and 208. When nut assembly 200 is removed from bolt 102, nut assembly 200 and bolt 102 remain secured to components 302 or 304, or other proximate structures using lanyard 126 and lanyard 208, respectively. Flat washer 106 and/or lock washer 104 may be easily replaced by unthreading retainer 108 from nut 110, removing the washer to be replaced, installing a replacement washer, and threading retainer 108 back onto nut 102.

The above-described methods and systems for captive retaining fasteners are cost-effective and highly reliable. The methods described herein prevent having to replace either a portion or all of the fastening system after it has been lost or dropped. Such replacement in a hostile environment is costly and difficult. Capturing dropped parts of the fastening system prevents damage to existing structure or structures. By integrating the nut, washer and lock washer and a bolt into two separate assemblies that can be tethered to respective structures permits the use of a wrench or socket to apply torque to the nut and bolt. The washer and lock washer are attached to the nut via a retaining ring. The nut assembly includes a snap ring and lanyard, and the bolt includes a snap ring with a lanyard attached to the ring. Both lanyards are attached to the structure to secure the bolt and nut assemblies from floating away or being dropped. The ability to attach a socket to either of the assemblies is maintained. The methods and systems facilitate operation of the fastening system in a cost-effective and reliable manner.

While the invention has been described in terms of various specific embodiments, those skilled in the art will recognize that the invention can be practiced with modification within the spirit and scope of the claims.

What is claimed is:

1. An integrated captive fastener system comprising:
    an integrated nut assembly configured to be tethered to a first structure, said nut assembly comprising a flat washer, a nut, and a retainer, said retainer threadably couplable to said nut such that when external threads of said retainer engage said nut, said flat washer is loosely held between said retainer and said nut, said flat washer comprising a counter-bored central aperture, a radially outwardly extending retaining portion of said retainer is received within said counter-bored central aperture to retain said flat washer; and
    a bolt configured to be tethered to at least one of the first structure and a second structure, the nut assembly configured to be threadably couplable to said bolt.

2. A system in accordance with claim 1 wherein said nut assembly comprises a lock washer configured for coupling between said flat washer and said nut using said retainer.

3. A system in accordance with claim 1 wherein said nut assembly comprises a nut having a circumferential groove configured to receive a snap-ring.

4. A system in accordance with claim 1 wherein said retainer comprises a tubular body having the external threads about a first end and the radially outwardly extending retaining portion at a second opposite end.

5. A system in accordance with claim 1 wherein at least one of said nut and said bolt comprises a circumferential groove configured to receive a complementary snap-ring.

6. A system in accordance with claim 1 wherein said nut comprises:
    a first set of threads formed therein for engaging said bolt; and
    a second set of threads formed therein for engaging said retainer, said first set of threads having a first diameter and said second set of threads having a second diameter, the second diameter larger than the first diameter.

7. A captive fastener system for securing two components to one another comprising:
    an integrated nut assembly comprising a retainer, a nut, and a flat washer, said flat washer loosely held between said nut and said retainer, said retainer threadably coupled to a first set of threads formed in a first portion of said nut, said retainer comprising a radially outwardly extending portion for engaging said flat washer; and
    a bolt configured to be threadably couplable to a second set of threads formed in a second portion of said nut.

8. A system in accordance with claim 7 wherein said flat washer comprises a counter-bored central aperture configured to engage said radially outwardly extending retaining portion of said retainer.

9. A system in accordance with claim 7 wherein said retainer comprises a tubular body having external threads about a first end and said radially outwardly extending retaining portion at a second opposite end to engage said flat washer.

10. A system in accordance with claim 7 wherein at least one of said nut and said bolt comprises a circumferential groove configured to receive a complementary snap-ring.

11. A system in accordance with claim 7 wherein said at least one of said nut and said bolt comprises a snap-ring tethered to a captive structure.

12. A system in accordance with claim 7 wherein said integrated nut assembly further comprises a lock washer configured to be compressed between said nut and said flat washer when said nut assembly is fully assembled to said bolt.

* * * * *